Patented Jan. 7, 1930

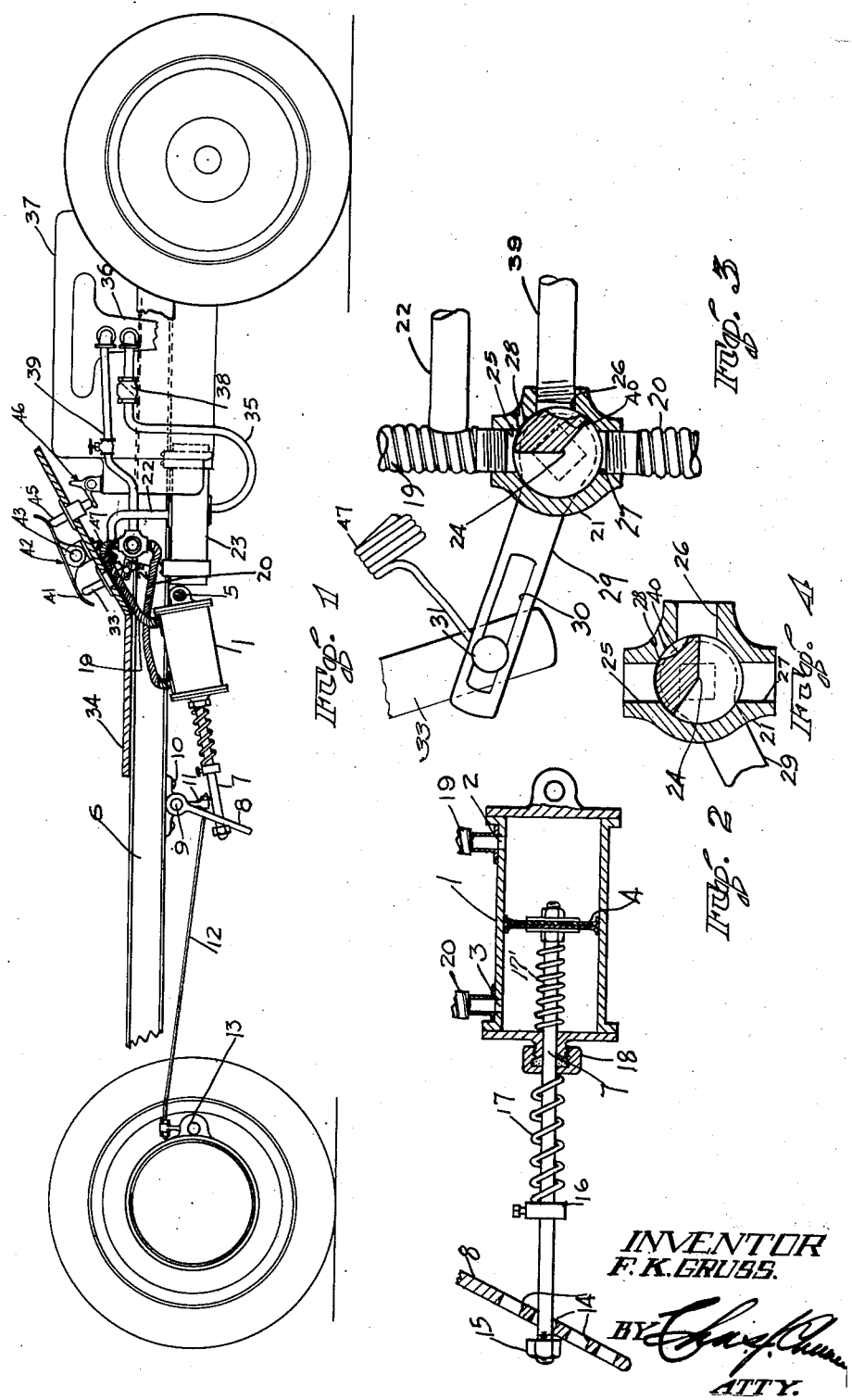

1,742,444

UNITED STATES PATENT OFFICE

FRANCIS K. GRUSS, OF REDWOOD CITY, CALIFORNIA, ASSIGNOR TO HIMSELF, FRANCIS J. GRUSS, OF REDWOOD CITY, CALIFORNIA, AND LUCIAN ABADIE, OF BERKELEY, CALIFORNIA, AS TRUSTEES

VACUUM BRAKE

Application filed December 14, 1925. Serial No. 75,163.

This invention resides in the provision of a simple, inexpensive and efficacious automobile brake mechanism which is operated by the suction of the engine of the automobile engine.

One of the objects of the invention is to provide suction brake mechanism which may be operated when the motor of the automobile runs at slow speeds as well as under ordinary running conditions and which does not interfere with the operation of the pedal and emergency brake mechanisms.

A further object of the invention is to provide suction operated brake mechanism which may be easily and quickly regulated to vary the braking force as desired.

A further object of the invention is to provide an operating member, preferably in the form of a pedal, which is adapted to be associated with the automobile accelerator and with the brake mechanism of this invention, such that on one movement of the pedal the throttle valve of the automobile engine will be operated, and on another movement of the pedal, the brake mechanism will be operated, thereby simplifying and rendering the operation of the automobile easier and safer.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 represents a fragmentary view of a part of an automobile showing the brake mechanism of my invention in side elevation and as it would appear when in use.

Fig. 2 represents an enlarged sectional view of a part of the operating cylinder of the brake mechanism and its associated parts.

Fig. 3 represents an enlarged sectional view of the controlling valve.

Fig. 4 is a sectional view of the valve in position to cause the brakes to be applied.

In the embodiment of the invention shown in the accompanying drawing I provide an operating cylinder 1, having ports 2 and 3 adjacent its ends and provided with a piston 4 reciprocally mounted therein. This cylinder is pivoted as at 5 at one end to some convenient part of the frame 6 of the automobile whereby the cylinder is permitted vertical swinging movement necessary to the proper operation of the mechanism. A piston rod 7 extends rearwardly from the cylinder and is connected at its outer end with a crank arm 8 depending from a shaft 9, disposed transversely of the frame 6 in bearings 10. This shaft has the customary crank arms 11 to which brake rods 12 are connected, said rods being extended rearwardly and connected with brake mechanisms, one of which is shown at 13 on one of the rear wheels. The piston rod 7 is adapted to extend through any one of a number of spaced openings 14 provided in the crank arm 8 and has a nut 15 turned on its outer end to act as a stop. The crank arm 8 is capable of free movement without causing the piston rod 7 to move. This then would provide for the operation of the crank arm and the brakes with the ordinary operating mechanism as now commonly used on automobiles, it being thought unnecessary to illustrate this operating mechanism. However, when the piston is moved inwardly towards the cylinder, on the operation of the mechanisms of this invention, the crank arm 8 is caused to rock so as to rotate the shaft 9 and the proper force is directed to the rod 12 to apply the brakes 13. The force of the brakes may be regulated by fastening the rod 7 in the different holes 14. A collar 16 is fixed on the rod 7 between its ends and acts as an abutment for one end of an expansion spring 17, the other end of which spring abuts the stuffing box 18 on the adjacent end of the cylinder. The spring 17 acts to return the piston 4 and its associated parts to neutral or normal position as shown in Fig. 2. Another spring 17' surrounds the piston rod and is disposed between the piston and rear end of the cylinder. This spring serves as a stop to insure the movement of the piston to normal position.

Leading from the ports 2 and 3 are flexible pipes 19 and 20, the other ends of which are connected with a valve casing 21 suitably supported on the automobile. A pipe 22 extends upwardly from a suction tank 23 suitably supported underneath the frame 6 and is connected with the pipe 19. A rotary valve 24 is mounted in the casing for controlling the ports 25, 26 and 27, with which the pipes 19, 39 and 20 communicate. This valve also controls a small vent port or opening 28 provided in one side of the valve casing. An operating lever 29 is suitably connected with the valve and is provided with an elongated slot 30 adapted to receive a pin 31 carried on the lower end of a plunger 33 mounted in the floorboards 34 of the automobile, and when depressed, rocks the lever 29 so as to turn the valve 24 in such manner as to cause the brakes to be applied.

A suction pipe 35 is connected with the tank 33 at one end and with the intake manifold 36 of the engine 37 at its other end. A check valve 38 is mounted in this pipe 35. This valve permits the suction induced in the manifold 36 to be likewise induced in the pipe 35 and in the tank 23, but closes against a flow of fluid towards the manifold. An auxiliary suction pipe 39 is connected at one end with the intake manifold 36 and at its other end with the valve casing at the port 26.

The valve 24 is substantially semi-cylindrical and provided on its curved face with a depression 40, which depression is adapted to communicate the ports 26 and 28 with one another as will be later more fully described.

*Operation*

Normally the valve is in position shown in Fig. 3, there being at this time a free passage through the valve casing communicating the ports 25 and 27. When the motor is started the suction created by the engine is induced in the pipe 35, tank 23, pipe 22, pipe 19, valve casing 21, pipe 20 and cylinder 1. This produces an equal vacuum in the cylinder on opposite sides of the piston 4, and the piston is therefore held against movement. Air is also exhausted from the pipe 39 up to the valve, which at this time closes the port 26, with which the pipe 39 is connected. When it is desired to apply the brakes, the operator depresses the heel portion 41 of the pedal 42 which is pivoted between its ends as at 43 upon the floorboard 34. This pushes downward on the plunger 32 and causes the lever 29 to be moved so as to turn the valve 24 into such position that the port 25 will be fully closed and the port 26 opened. Immediately on the opening of the port 26 the suction force is again induced through the pipe 20 and in the rear end of the cylinder 1 and the piston is held against movement due to the equal forces exerted. After the port 26 is opened, a slight further opening movement of the valve brings the depression 40 into registration with the port 28 and as this depression is at the same time in registration with the port 26 which is open and in communication with the port 27, the rear end of the cylinder and also the pipe 39 are in direct communication with the atmosphere. Atmospheric air entering the system through the port 28 passes into the pipes 39 and 20 and the rear end of the cylinder 1, thereby reducing the suction force, or in other words, breaking the vacuum in said end of the cylinder to such extent that the suction force in the front end of the cylinder becomes effective immediately and brings about a forward movement of the piston and piston rod. On further depressing the pedal and consequent movement of the valve, the port 28 is opened to a greater extent, permits a greater amount of atmospheric air to enter the cylinder and thereby further diminishes or reduces the suction force in the rear end of the cylinder, thereby increasing the effective force of the suction action in the front end of the cylinder. When the piston and piston rod are moved in this manner, the crank arm 8 rocks and turns the shaft 9 so that the crank arms 11 pull on the brake rods 12 and operate the brake mechanisms 13 so as to apply the brakes. In this way the force of the braking action is regulated by the degree of movement of the pedal and operating plunger 32, this operation being substantially the same as that of an ordinary brake pedal wherein the braking action increases with the increased pressure on the pedal.

On release of pressure from the pedal 42, a spring 47 suitably connected with the valve mechanism acts to return the valve and its associated parts to normal position. At this time the spring 17 likewise returns the piston to its normal position, shown in Fig. 2. The other spring 17' acts as a stop to limit the movement of the piston and insure its being brought to the proper position to release the brakes. Immediately upon the return of the valve to normal position, the port 26 is covered and shuts off communication with the pipe 39 and working cylinder 1. However, the ports 25 and 27 are open and the pipes 19 and 20 communicating with opposite ends of the cylinder 1 are directly communicated with the auxiliary tank 23 through the pipe 22. Should the motor be at rest at this time, there will be sufficient suction force due to the employment of the auxiliary tank, to exhaust the air which has entered the rear end of the cylinder to set up an equal suction force on opposite sides of the piston so that when the motor is started and an immediate braking action becomes necessary, the mechanism will be prepared whereby on opening of the valve, such braking action will take place immediately. Therefore, it will be seen that the auxiliary tank insures the proper operation of the mechanism and makes possible an immediate braking action when the valve is given a predetermined movement.

The pedal 42 is preferably arranged as shown in Fig. 1 so that its forward end extends over and is adapted to engage the accelerator button or plunger 45. This accelerator button or plunger operates the usual mechanism, part of which is shown at 46 for controlling the throttle valve, not shown. In this way on pushing the forward end of the pedal downward with the toe of the foot, the operator can control the throttle valve in the ordinary manner. Upon release of pressure on the forward end of the pedal, the throttle valve moves to its normal position and the heel 41 of the pedal is in position then to operate the brake mechanism. Upon now depressing the heel portion, the plunger 32 is depressed and the lever 29 of the valve moved so as to operate the valve as previously described. The spring 47 associated with the valve mechanism returns the pedal to normal position. This spring may be attached to the lever 29 and to the automobile in any suitable manner. By this arrangement of the pedal with relation to the accelerator and brake plungers, the operation of the automobile is made easier and safer. The brakes are not applied of course, under ordinary conditions of use until the speed of the engine is decelerated. The action of decelerating with this pedal requires the lifting of the toe and the depression of the heel, and the depression of the heel will bring about the application of the brakes.

It will thus be seen that the piston of the brake mechanism of this invention when in a predetermined position between the ends of the cylinder in which it is mounted, maintains the brake mechanisms free and as released. The piston is maintained in this position by creating equal pneumatic pressure or force on opposite sides thereof within said cylinder and the movement of the piston is effected by a differential in these pressures, preferably by decreasing the force of the pressure on one side of the piston whereby the force on the other side becomes effective as a medium for moving the piston.

It will be noted that a suction force is maintained on both sides of the piston while one side of the piston is open to the atmosphere. This is a desirable arrangement inasmuch as it provides for an accurate controlling of the operation at all times and permits of the application of the braking force to any degree desired. If but a small amount of atmosphere is admitted into the cylinder on one side of the piston, the diminution of suction force on said side is slight and the force on the other side effects but a slight movement of the piston so that if the operator releases pressure on the foot mechanism and closes the communication to the atmosphere, the diminished force will be immediately restored to normal and the piston will be moved back to center or normal position, thereupon releasing the brakes. By this arrangement the portions of the cylinder 1 on opposite sides of the piston are at all times in communication with the intake manifold and the suction force is at all times applied thereto but with varying degrees of effectiveness however, as to the movement of the piston, this depending upon the amount of atmospheric air admitted to one side of the cylinder.

It is to be noted that the air may enter the port 28 faster than it can be drawn out through the port 26 and pipe 39 when these two ports are brought into communication. Thus, with the valve in the position shown in Fig. 4, the vacuum force to the end of the cylinder with which the pipe 20 is communicated, is reduced to the maximum extent, but with only a slight opening of the port 28, and the valve in position to allow said port to communicate with the ports 26 and 27, it will be seen that the vacuum force is not altogether diminished but reduced. By varying this opening of the port 28 with the movement of the valve, the vacuum force in said end of the cylinder is also varied. The varying of this vacuum force means that the resistance to the operative vacuum force on the other side of the piston is varied and the braking force may thus be regulated by varying the resistance on one side of the piston to the force on the other side of the piston, which force tends to apply the brakes.

I claim:

1. A device of the character described including a cylinder, a piston reciprocally mounted within the cylinder, a piston rod carried by the piston, a source of suction, a valve casing having ports therein, pipes extending from said ports to and being communicated with the ends of the cylinder, a pipe connected with one of the last named pipes and leading to the source of suction, a check valve in said last named pipe, said valve casing having another port therein, a pipe communicating with the last named port and with the source of suction, said valve casing having a port therein communicating with the atmosphere and a valve in said casing which when in one position opens the first named ports with which the pipes leading to the cylinder are connected and closes the second named port with which the second named pipe to the source of suction is connected, said valve when being moved into another position closes one of the first named ports and opens the second named port and when moved into still another position while maintaining one of the first named ports closed and the second named port open, communicates the open ports with the port leading to the atmosphere and means for operating said valve.

2. A device of the character described including the vehicle, of a cylinder, a piston reciprocally mounted within the cylinder, a piston rod carried by the piston, a source of suction, a valve casing having ports therein, pipes extending from said ports to and being communicated with the ends of the cylinder, a pipe connected with one of the last named pipes and leading to the source of suction, said valve casing having another port therein, a pipe communicating with the last named port and with the source of suction, said valve casing having a port therein communicating with the atmosphere and a valve in said casing, which when in one position opens the first named ports with which the pipes leading to the cylinder are connected and closes the second named port with which the second named pipe to the source of suction is connected, said valve when being moved into another position closes one of the first named ports and opens the second named port and when moved into still another position, while maintaining one of the first named ports closed and the second named port open, communicates the open ports with the port leading to the atmosphere, means for operating said valve and an auxiliary tank connected in the first named pipe line to the source of suction.

3. In apparatus of the character described, a cylinder; a piston reciprocally mounted within the cylinder; a piston rod carried by the piston; a source of suction force; means establishing communication between said source and the ends of the cylinder for creating a suction force within the cylinder, which means includes valve mechanism for controlling the suction force, said valve mechanism when in one position permitting of an equal suction force within the cylinder on opposite sides of the piston and when in another position communicating the portion of the cylinder on one side of the piston with the atmosphere while maintaining said portion of the cylinder in direct communication with the source of suction, and also maintaining the other portion of the cylinder in unbroken communication with the source of suction.

4. In apparatus of the character described, a cylinder; a piston reciprocally mounted within the cylinder; means associated with the piston providing for application of power derived from movement of the piston to other mechanisms; a source of suction force; a valve member having ports therein; pipes extendinig from said ports to and being communicated with portions of the cylinder on opposite sides of the piston; a pipe connecting another of said ports with the source of suction; another pipe connected with the source of suction and with one of the first named pipes; a check valve in the last named pipe; another of said valve ports communicating with the atmoshpere and a movable valve member associated with the ported valve member and operating when in one position to establish communication of both ends of the cylinder with a source of suction, which valve member when in another position communicates one of the first named pipes with the atmosphere while maintaining both of said first named pipes in communication with the suction source.

.FRANCIS K. GRUSS.